US012684080B2

(12) United States Patent
Vu

(10) Patent No.: US 12,684,080 B2
(45) Date of Patent: Jul. 14, 2026

(54) IMAGE FORMING APPARATUS

(71) Applicant: KYOCERA Document Solutions Inc., Osaka (JP)

(72) Inventor: Hung Manh Vu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 351 days.

(21) Appl. No.: 18/616,137

(22) Filed: Mar. 25, 2024

(65) Prior Publication Data

US 2024/0333860 A1     Oct. 3, 2024

(30) Foreign Application Priority Data

Mar. 28, 2023     (JP) ................................. 2023-051157

(51) Int. Cl.
*H04N 1/44*             (2006.01)

(52) U.S. Cl.
CPC ........... *H04N 1/446* (2013.01); *H04N 1/4453* (2013.01)

(58) Field of Classification Search
CPC .. H04N 1/446; H04N 1/4453; H04N 1/00554; G03G 15/60; G03G 21/1604; G03G 21/1633; G03G 21/1642
See application file for complete search history.

(56) References Cited

U.S. PATENT DOCUMENTS

| | | | | | |
|---|---|---|---|---|---|
| 6,510,301 | B2 * | 1/2003 | Tanaka | ............... | H04N 1/00554 |
| | | | | | 399/125 |
| 7,506,902 | B2 * | 3/2009 | Sheng | ................ | G03G 21/1666 |
| | | | | | 292/133 |
| 8,610,910 | B2 * | 12/2013 | Nishikawa | ......... | H04N 1/00557 |
| | | | | | 399/113 |
| 8,767,231 | B2 * | 7/2014 | Nishikawa | ......... | H04N 1/00278 |
| | | | | | 399/113 |
| 8,977,164 | B2 * | 3/2015 | Hsiung | .............. | H04N 1/00554 |
| | | | | | 399/125 |
| 9,197,774 | B2 * | 11/2015 | Jo | ........................ | H04N 1/00554 |
| 10,427,896 | B2 * | 10/2019 | Oyama | .............. | G03G 21/1633 |
| 2006/0222435 | A1 * | 10/2006 | Ha | ...................... | H04N 1/00519 |
| | | | | | 400/691 |
| 2007/0047028 | A1 * | 3/2007 | Hashimoto | ........ | H04N 1/00559 |
| | | | | | 358/498 |
| 2007/0195381 | A1 * | 8/2007 | Yamazaki | .......... | H04N 1/00559 |
| | | | | | 358/502 |
| 2021/0289089 | A1 | 9/2021 | Fukuma | | |

FOREIGN PATENT DOCUMENTS

JP          2021148821 A     9/2021

* cited by examiner

*Primary Examiner* — Qian Yang
(74) *Attorney, Agent, or Firm* — Studebaker Brackett PLLC

(57) ABSTRACT

An image forming apparatus includes an apparatus main body, a reading unit, a document cover and a lock part. The reading unit is provided on an upper portion of the apparatus main body in an openable and closable manner, and readable an image of a document. The document cover is provided on an upper portion of the reading unit in an openable and closable manner, and presses the document placed on the reading unit. The lock part holds one of the reading unit and the document cover in a closed state when the other of the reading unit and the document cover is in an opened state.

6 Claims, 12 Drawing Sheets

IMAGE FORMING APPARATUS

INCORPORATION BY REFERENCE

This application is based on and claims the benefit of priority from Japanese patent application No. 2023-051157 filed on Mar. 28, 2023 which is incorporated by reference in its entirety.

BACKGROUND

The present disclosure relates to an image forming apparatus.

An image forming apparatus having provided with a lock mechanism for selectively locking one of a document reading unit and a document cover in a closed state is known. The lock mechanism includes an operation member, a front lateral slide member, a rocking member, a protrusion, and a body cover protrusion. The operation member can be displaced in response to user operation. The front lateral slide member is interlocked with the displacement of the operation member, and is displaced between a position where a pair of first engaged parts is locked by the pair of first engaging parts and a position where they are released. The rocking member has a contacted part extending laterally from the base part and a third locking part extending upward from the base part. The cover protrusion has a third locked part which restricts the upward movement of the document cover by being locked by the third locking part. The body protrusion pushes up the contact part and holds the rocking member in the release position when the document reading unit is closed.

However, in the above-described technique, it is necessary for the user to operate one of the document reading unit and the document cover through the operation member in order to selectively lock the document reading unit and the document cover in the closed state. In addition, the operation member must have a structure capable of being displaced, and the member interlocked with the operation member such as the front lateral slide member and the rocking member must also have a movable structure, resulting in a complicated structure of the lock mechanism.

SUMMARY

An image forming apparatus according to the present disclosure includes an apparatus main body, a reading unit, a document cover and a lock part. The apparatus main body houses an image forming unit which forms an image on a medium. The reading unit is provided on an upper portion of the apparatus main body in an openable and closable manner, and readable an image of a document. The document cover is provided on an upper portion of the reading unit in an openable and closable manner, and presses the document placed on the reading unit. The lock part holds one of the reading unit and the document cover in a closed state when the other of the reading unit and the document cover is in an opened state. The lock part includes a turning member, a first protrusion member, a second protrusion member, a slide biasing member and a turn biasing member. The turning member is supported in an inside of the reading unit in a slidable manner in a horizontal direction and in a turnable manner around a rotational shaft. The first protrusion member is protruded from the upper portion of the apparatus main body, and configured to enter the inside of the reading unit in the closed state and be disposed on one side of a sliding direction of the turning member. The second protrusion member is protruded from a lower portion of the document cover, and configured to enter the inside of the reading unit when the document cover is in the closed state and be disposed on the other side of the sliding direction of the turning member. The slide biasing member biases the turning member to one side of the sliding direction. The turn biasing member biases the turning member to one side of a turning direction. The turning member has a first hook portion configured to be engageable with the first protrusion member below the rotational shaft; and a second hook portion configured to be engageable with the second protrusion member above the rotational shaft. In a case where the reading unit and the document cover are in the closed state, the turning member is pushed by the first protrusion member to the other side of the sliding direction against a biasing force of the slide biasing member to be disposed in a first position, and is pushed by the second protrusion member to the other side of the turning direction against a biasing force of the turn biasing member to be in a release posture where the first hook portion and the second hook portion are separated from the first protrusion member and the second protrusion member. In a case where the document cover is in the opened state, the second protrusion member is separated from the turning member, the turning member is disposed in the first position, is biased by the turn biasing member to be turned to one side of the turning direction and is in a first engagement posture where the first hook portion is engaged with the first protrusion member. In a case where the reading unit is in the opened state, the first protrusion member is separated from the turning member, the turning member is biased by the slide biasing member to one side of the sliding direction to be disposed in a second position, is biased by the turn biasing member to be turned to one side of the turning direction, and is in a second engagement posture where the second hook is engaged with the second protrusion member.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
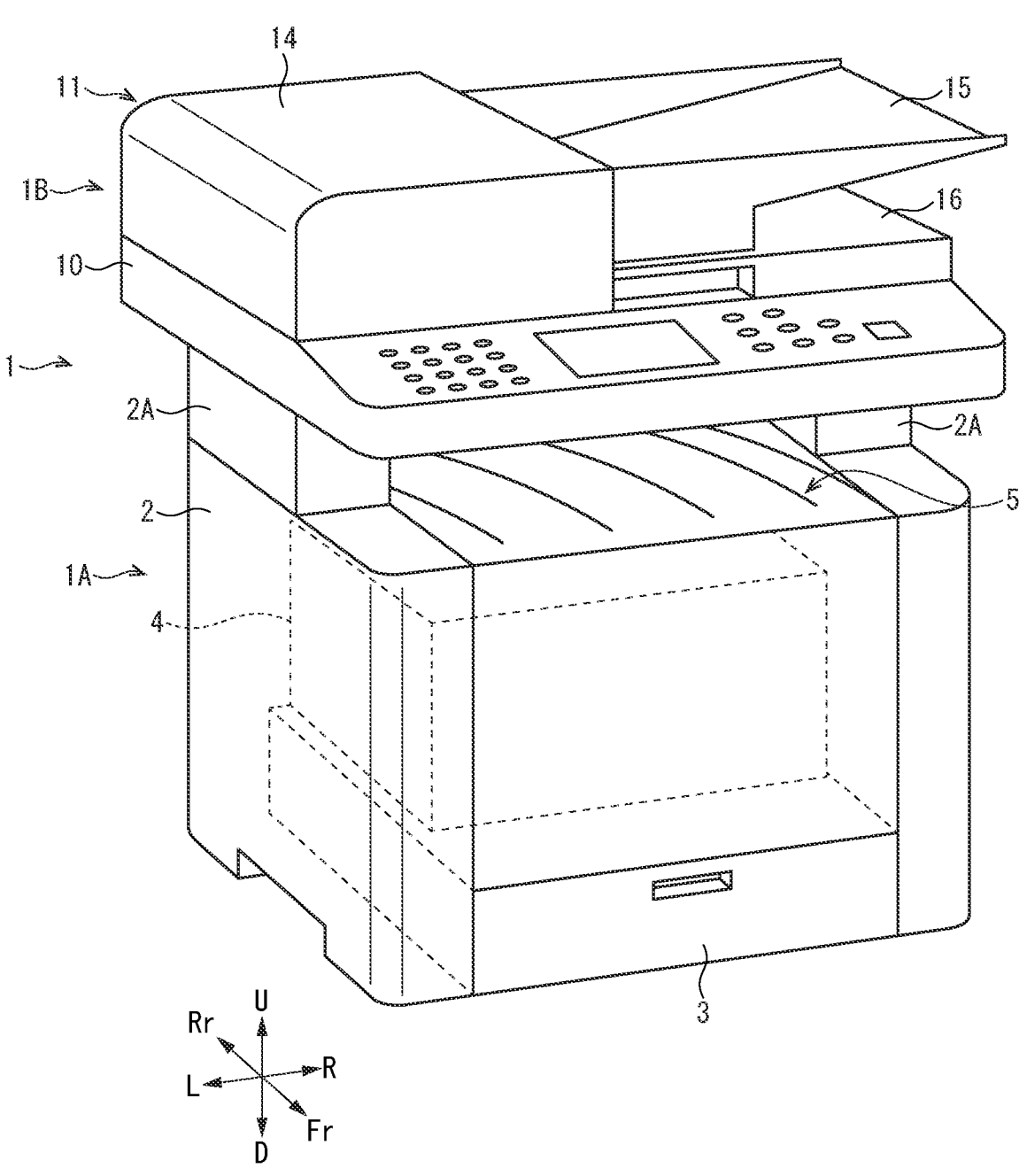
FIG. 1 is a perspective view showing an image forming apparatus according to one embodiment of the present invention.

Hereinafter, with reference to the attached drawings, the embodiments of the present invention will now be described. Note that Fr, Rr, L, R, U, and D shown in the drawings indicate the front, the rear, the left, the right, the upper, and the lower. Although directional and positional terms are used herein, they are used for convenience of description and do not limit the technical scope of the present invention.

Figure 2:
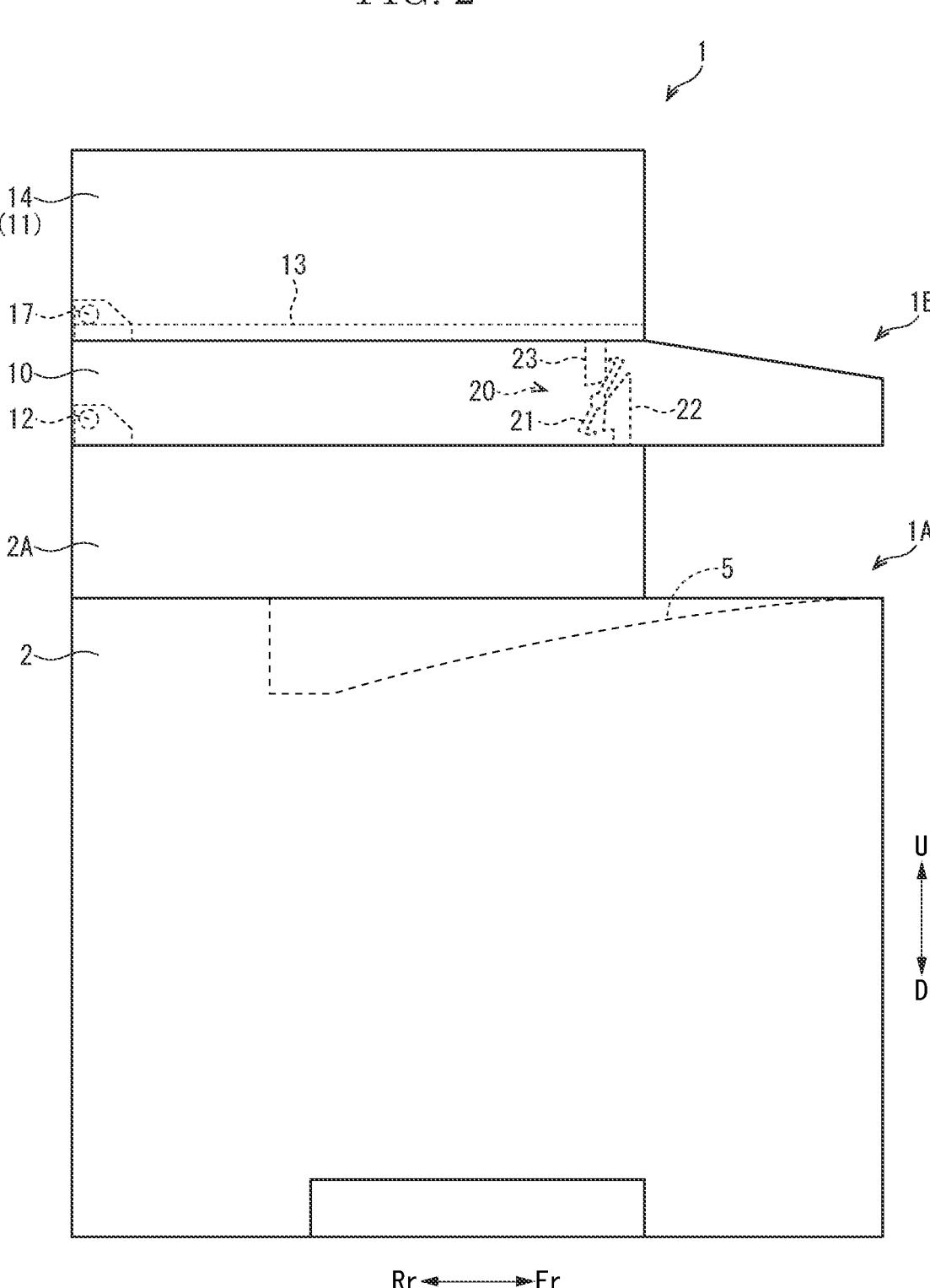
FIG. 2 is a side view showing the image forming unit of the image forming apparatus according to the embodiment of the present invention.
Figures 3A, 3B:
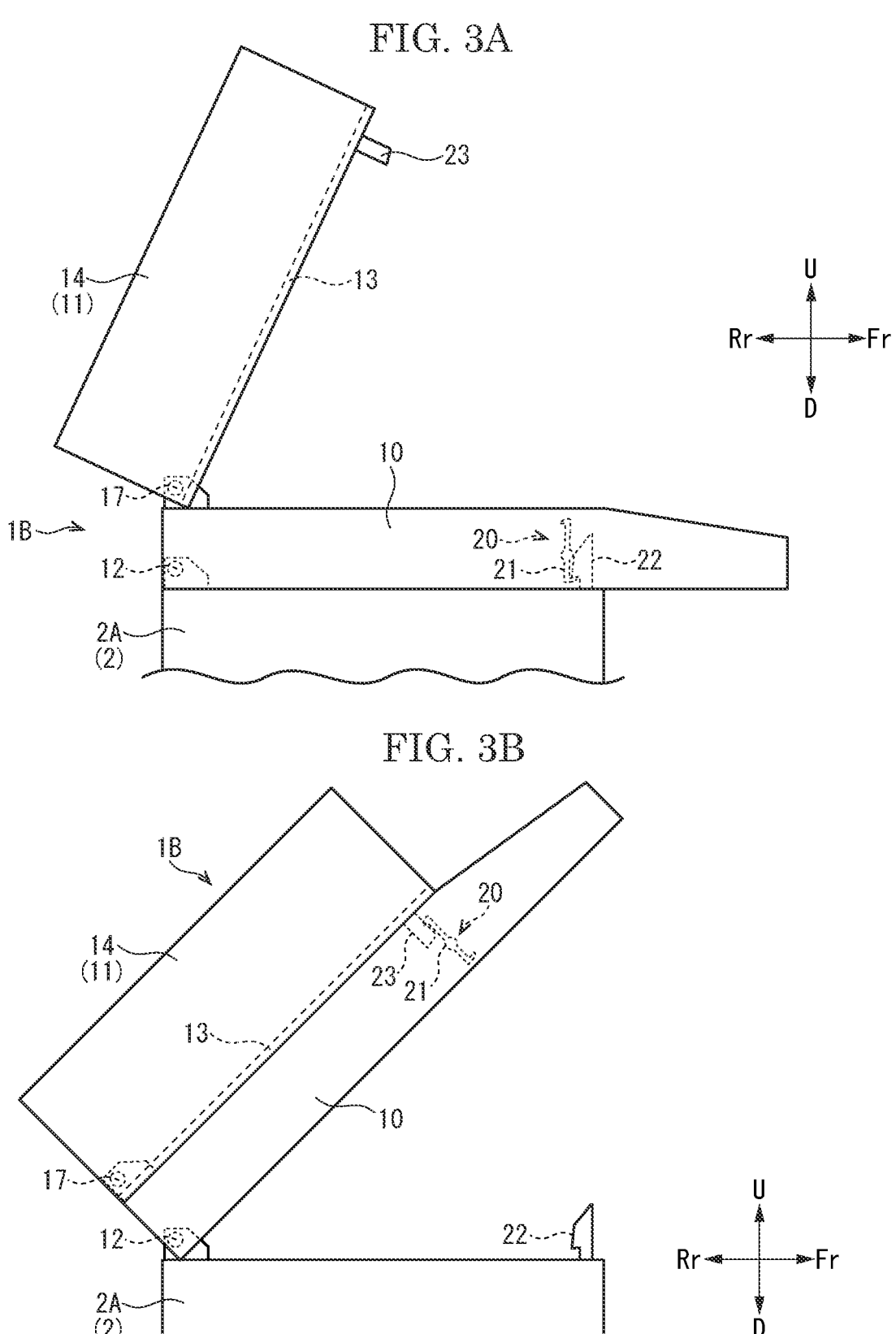
FIG. 3A is a side view showing a document cover in an opened state and a reading unit in a closed state, which are a part of the image forming apparatus according to the embodiment of the present invention.
FIG. 3B is a side view showing the document cover in a closed state and the reading unit in an opened state, which are a part of the image forming apparatus according to the embodiment of the present invention.

[Image forming apparatus] With reference to FIG. 1, FIG. 2, FIG. 3A and FIG. 3B, the image forming apparatus 1 will be described. FIG. 1 is a perspective view showing the image forming apparatus 1. FIG. 2 is a side view showing the image forming apparatus 1. FIG. 3A is a side view showing a document cover 13 (document conveying device 11) in an opened state and a reading unit 10 in a closed state. FIG. 3B is a side view showing the document cover 13 (document conveying device 11) in a closed state and the reading unit 10 in an opened state.

The image forming apparatus 1 includes an image forming device 1A and an image reading device 1B.

[Image Forming Device] As shown in FIG. 1, the image forming device 1A includes a device main body 2 constituting a substantially rectangular parallelepiped appearance. The device main body 2 includes a sheet feeding cassette 3 in which a sheet (not shown) as an example of the medium is stored, and an image forming unit 4 which forms an image on the sheet in an electrophotographic manner. The sheet feeding cassette 3 is detachably provided in the lower portion of the device main body 2, and the image forming unit 4 is arranged above the sheet feeding cassette 3. On the upper surface of the device main body 2, a sheet discharge tray 5 on which the sheet having the formed (printed) image is provided. Although not shown, the image forming unit 4 includes a configuration such as a toner container, a photosensitive drum, a charging device, a developing device, a transfer roller, an optical scanning device, a fixing device, and the like necessary for forming the image on the sheet in an electrophotographic manner. The image forming unit 4 may form a full-color image or a monochrome image.

In the rear portion of the upper portion of the device main body 2, a coupling support portion 2A for supporting the image reading device 1B is provided. The coupling support portion 2A is formed in a substantially U-shape so as to surround substantially the rear half of the sheet discharge tray 5 when viewed in a plane. The coupling support portion 2A is a part of the device main body 2 and is integrally formed with the device main body 2. The device main body 2 including the coupling support portion 2A includes a metal frame and a synthetic resin member fixed to the frame.

[Image Reading Device] As shown in FIG. 1, the image reading device 1B includes a reading unit 10 and a document conveying device 11. The reading unit 10 has a function of reading an image of a document (not shown), and the document conveying device 11 has a function of conveying the document to a reading position by the reading unit 10.

<Reading Unit> The reading unit 10 is provided so as to be opened and closed (rotated) on the upper portion of the device main body 2. More specifically, as shown in FIG. 2, the reading unit 10 is attached to the rear upper portion of the coupling support portion 2A via a first hinge portion 12, and is disposed at a position upwardly away from the sheet discharge tray 5. A sheet discharge space is formed between the sheet discharge tray 5 and the reading unit 10 so that a plurality of the sheets can be loaded. The reading unit 10 turned to the closed state is in a substantially horizontal posture facing the sheet discharge tray 5 across the sheet discharge space (see FIG. 2 and FIG. 3A). By bouncing up the front portion around the first hinge portion 12, the reading unit 10 is turned to the opened state. The reading unit 10 turned to the opened state is in an inclined posture to open the sheet discharge space (see FIG. 3B). The reading unit 10 is turned to the closed state at the time of image forming operation and is turned to the opened state when a sheet jam occurs at the sheet discharge part.

It should be noted that the reading unit 10 includes a housing having a substantially rectangular parallelepiped shape of a lower height, and on the upper surface of the front portion of the housing, a touch panel, a button, or the like are provided for the user to input various instructions such as image formation and document reading, and to present various kinds of information (see FIG. 1). Also, although not shown, the housing of the reading unit 10 includes a structure such as a scanning unit, a reflection unit, an image sensor, and the like necessary for converting optically read image information of the document into an electrical signal. The upper surface of the housing is a glass surface, and the reading unit 10 optically reads the image of the document placed on the glass surface.

<Document Conveying Device> As shown in FIG. 1 and FIG. 2, the document conveying device 11 includes a document cover 13, a conveying mechanism 14, a document supply tray 15, and a document discharge tray 16.

(Document Cover) The document cover 13 is provided on the upper portion of the reading unit 10 so as to be opened and closed (turned). More specifically, as shown in FIG. 2, the document cover 13 is attached to the rear upper portion of the housing of the reading unit 10 via a second hinge portion 17. The document cover 13 supports the conveying mechanism 14, the document supply tray 15 and the document discharge tray 16, and the whole document conveying device 11 is opened and closed by opening and closing the document cover 13. The document cover 13 is formed so as to cover the entire upper surface (glass surface) of the reading unit 10. The document cover 13 turned to the closed state is in a substantially parallel posture to the upper surface of the reading unit 10 (see FIG. 2 and FIG. 3B). By bouncing up the front portion around the second hinge portion 17, the document cover 13 is turned to the opened state. The document cover 13 turned to the opened state is in an inclined posture to open the upper surface (glass surface) of the reading unit 10 (see FIG. 3A). The document cover 13 is turned to the opened state when the document is placed on or taken out from the reading unit 10 (glass surface). The document cover 13 is turned to the closed state when pressing the document placed on the reading unit 10 (glass surface).

(Conveying Mechanism, Document Supply Tray, Document Discharge Tray) As shown in FIG. 1, the conveying mechanism 14 is disposed on substantially the left half of the document cover 13. The document supply tray 15 extends from the upper right portion of the conveying mechanism 14 rightward. The document discharge tray 16 is formed on substantially the right half of the document cover 13, and is arranged at a position downward away from the document supply tray 15. The document whose image is read is set in the document supply tray 15, and the document whose image is read is discharged on the document discharge tray 16. A discharge space is formed between the document supply tray 15 and the document discharge tray 16 so that a plurality of the documents can be loaded. The conveying mechanism 14 has a casing formed in a substantially rectangular parallelepiped shape, and although not shown, the inside of the casing includes a configuration for separating the sheet of the document set in the document supply tray 15 one by one and then conveying it to the document discharge tray 16, such as a pickup roller and a conveyance roller. The reading unit 10 also has a function of reading the image of the document while the document is being conveyed by the conveying mechanism 14.

By the way, when the document cover 13 (document conveying device 11) is opened in the case where the reading unit 10 is turned to the opened state, an excessive load is applied to the hinge portions 12, 17, causing damage or failure. Accordingly, the image forming apparatus 1 according to the present embodiment includes a lock part 20 (see FIG. 2) for selectively maintaining one of the reading unit 10 and the document cover 13 in the closed state.

Figure 4:
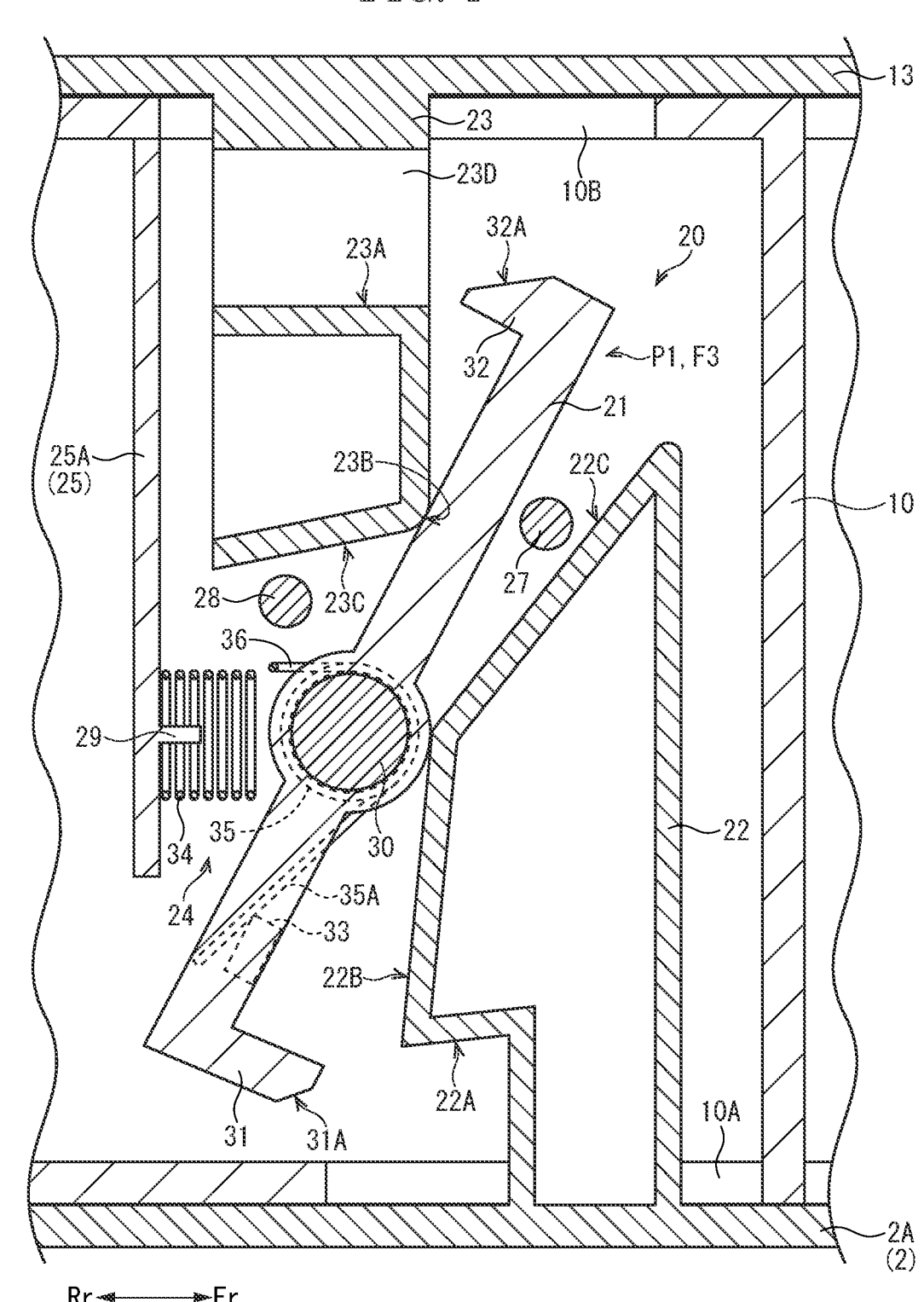
FIG. 4 is a cross sectional view showing a lock part of the image forming apparatus according to the embodiment of the present invention.
Figure 5:
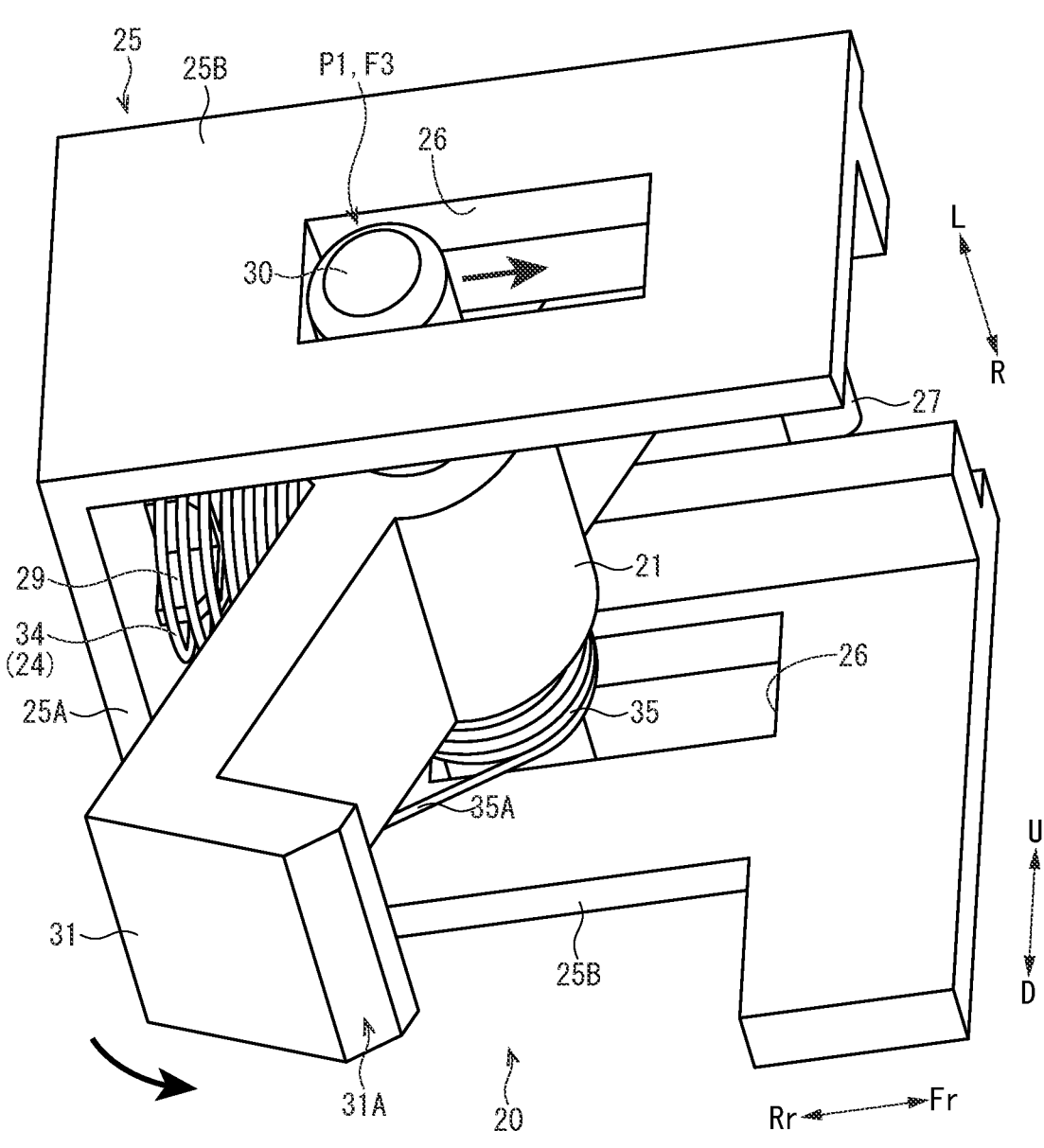
FIG. 5 is a perspective view showing a turning member in a first position, which is a part of the lock part of the image forming apparatus according to the embodiment of the present invention.
Figure 6:
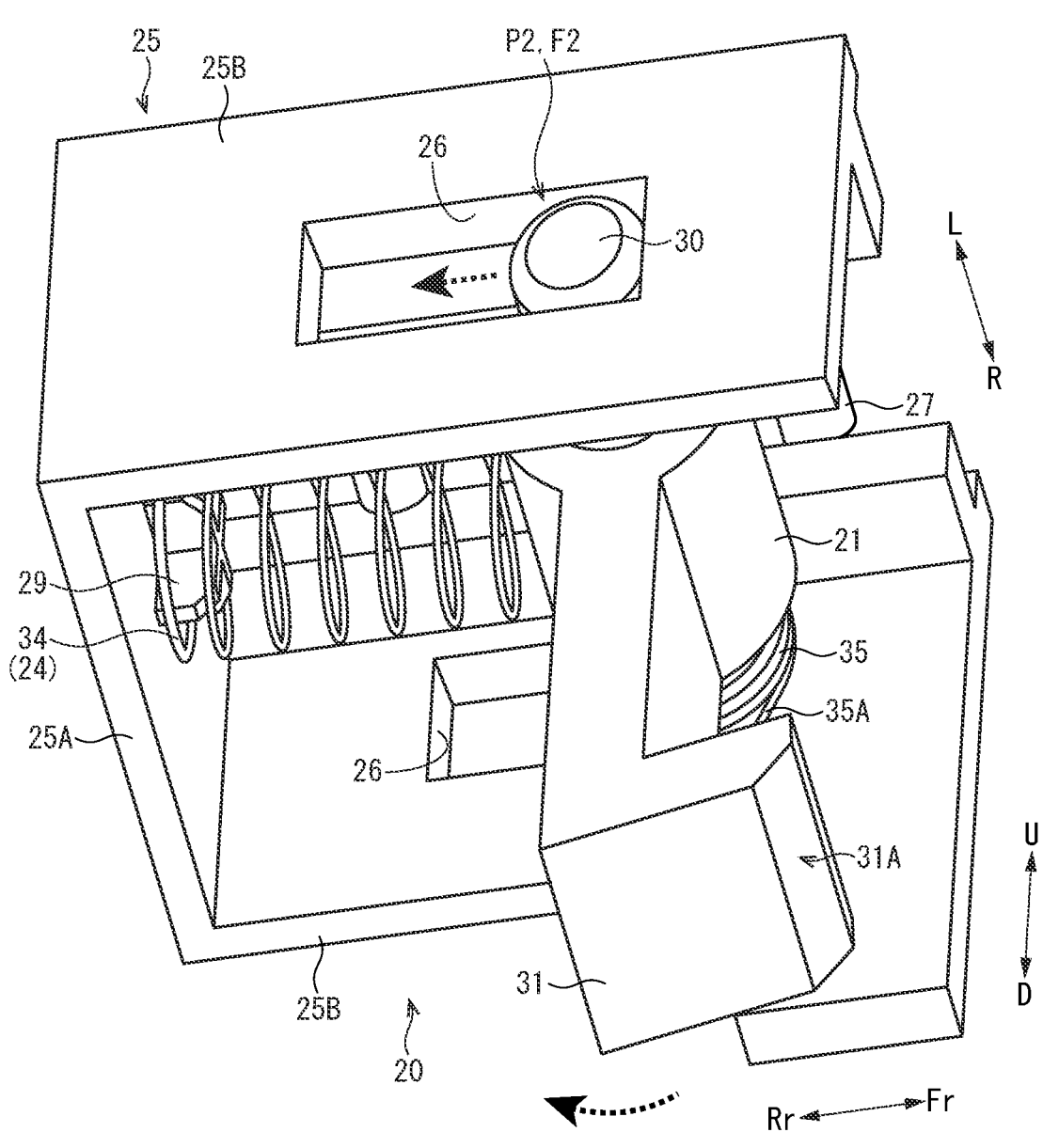
FIG. 6 is a perspective view showing the turning member in a second position, which is a part of the lock part of the image forming apparatus according to the embodiment of the present invention.
Figure 7:
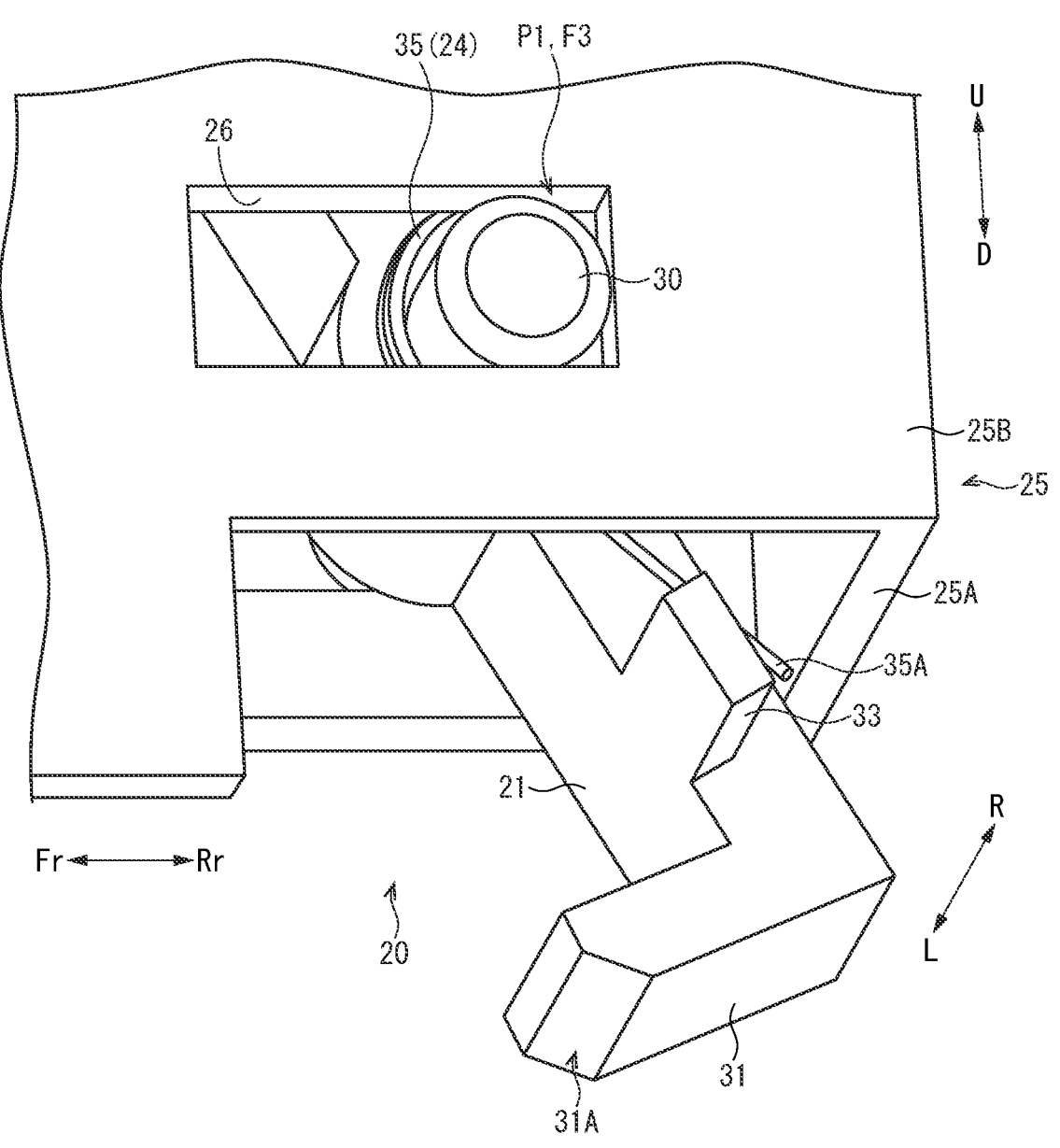
FIG. 7 is a perspective view showing the turning member in the first position, which is a part of the lock part of the image forming apparatus according to the embodiment of the present invention, viewed from another angle.

[Lock Part] Referring to FIG. 4 to FIG. 7, the lock part 20 will be described. FIG. 4 is a cross sectional view showing the lock part 20. FIG. 5 is a perspective view showing a turning member 21 at a first position P1. FIG. 6 is a perspective view showing the turning member 21 at a second position P2. FIG. 7 is a perspective view showing the turning member 21 at the first position P1 viewed from another angle.

The lock part 20 is arranged, for example, near the left front corner when viewed in a plane (see FIG. 2 or the others). As shown in FIG. 4 to FIG. 7, the lock part 20 includes a turning member 21, a first protrusion member 22, a second protrusion member 23, and a biasing member 24. A lock part 20 holds one of the reading unit 10 and the document cover 13 in the closed state when the other of the reading unit 10 and the document cover 13 is turned to the opened state.

<Turning Member> The turning member 21 is, for example, made of synthetic resin and formed in an elongated rod shape. A substantially cylindrical rotational shaft 30 is fixed to a substantially central portion of the turning member 21 in the longitudinal direction so as to protrude toward both sides in the left-and-right direction. A fixed portion of the rotational shaft 30 to the turning member 21 is formed in a cylindrical shape thicker than the other portion. A first hook portion 31 is formed at the lower end portion of the turning member 21 so as to protrude forward, a second hook portion 32 is formed at the upper end portion of the turning member 21 so as to protrude rearward, and the turning member 21 is generally formed in an S-shape (Z-shape). In the tip end of the first hook portion 31, a first inclined surface portion 31A is formed by cutting off the lower corner obliquely, and in the tip end of the second hook portion 32, a second inclined surface portion 32A is formed by cutting off the upper corner obliquely. A biasing receiving part 33 is formed at the lower portion of the turning member 21 so as to protrude from the right side surface rightward (see FIG. 7).

(Support Member) A support member 25 for supporting the turning member 21 is fixed to the inside of the reading unit 10 (housing) (near the left front corner) (see FIG. 4). The support member 25 is made of, for example, metal or synthetic resin, and formed as a part of the reading unit 10. As shown in FIG. 5 and FIG. 6, the support member 25 is formed in a substantially U-shape as viewed in a plane (or bottom) in which the side walls 25B are extended forward from both right and left ends of the rear wall 25A, and the front side is opened. Slide grooves 26, which are formed in a rectangular shape elongated in the front-and-rear direction when viewed from the side surfaces, are opened in the side walls 25B. Each of the slide grooves 26 is formed to have a height in which the end portion of the rotational shaft 30 can be inserted and a width of two times or more the diameter of the rotational shaft 30.

The turning member 21 is arranged between the side walls 25B, and both the right and left end portions of the rotational shaft 30 are inserted into the slide grooves 26. Thereby, the turning member 21 is supported inside the reading unit 10, and is slidable in the front-and-rear direction (lateral direction) while being guided by the slide grooves 26 and rotatable around the rotational shaft 30. The turning member 21 is slidable between a first position P1 (see FIG. 5) in which the rotational shaft 30 is disposed at the rear ends of the slide grooves 26 and a second position P2 (see FIG. 6) in which the rotational shaft 30 is disposed at the front ends of the slide grooves 26.

Further, the support member 25 (inside the reading unit 10) includes a first auxiliary protrusion 27 and a second auxiliary protrusion 28 which extend in the left-and-right direction (parallel to the rotational shaft 30) on both sides of the turning member 21 in the front-and-rear direction (sliding direction) (see FIG. 4). The first auxiliary protrusion 27 and the second auxiliary protrusion 28 are formed in a substantially cylindrical shape extending from the left side wall 25B of the support member 25 rightward, and are arranged above the rotational shaft 30. The first auxiliary protrusion 27 is disposed in front of the turning member 21, and the second auxiliary protrusion 28 is disposed in rear of the turning member 21. On the rear wall 25A of the support member 25, a support protrusion 29 formed in a cross shape when viewed from the front side protrudes forward (see FIG. 4 to FIG. 6).

<First Protrusion Member> As shown in FIG. 4, the first protrusion member 22 protrudes from the front upper portion of the left coupling support portion 2A, which is a part of the device main body 2. The first protrusion member 22 is formed in the shape of an arrowhead with a return. The first protrusion member 22 has a first engagement surface portion 22A, a first contact surface portion 22B, and a first guide inclined surface portion 22C. The first engagement surface portion 22A is a surface extending rearward and slightly downward from a position upwardly separated from the coupling support portion 2A. The first contact surface portion 22B is a surface extending upward and slightly forward from the tip (rear end) of the first engagement surface portion 22A. The first guide inclined surface portion 22C is a surface extending upward and forward from the tip (upper end) of the first contact surface portion 22B. The first guide inclined surface portion 22C is more inclined with respect to the vertical surface than the first contact surface portion 22B.

A first entry hole 10A is opened near the left front corner of the lower surface of the reading unit 10 (housing), and the first protrusion member 22 enters the inside of the reading unit 10 turned to the closed state through the first entry hole 10A. The first protrusion member 22 is disposed in front of the turning member 21 (one side in the sliding direction) inside the reading unit 10. The first guide inclined surface portion 22C of the first protrusion member 22 faces the lower portion of the first auxiliary protrusion 27 with a small gap.

<Second Protrusion Member> As shown in FIG. 4, the second protrusion member 23 protrudes on the lower portion of the document cover 13. The second protrusion member 23 is generally formed in a substantially rectangular parallel-epiped shape, and a through hole 23D (a substantially rectangular parallelepiped space) is formed in the upper portion of the second protrusion member 23 so as to penetrate in the front-and-rear direction. The second protrusion member 23 has a second engagement surface portion 23A, a second contact surface portion 23B, and a second guide inclined surface portion 23C. When the document cover 13 is turned to the closed state, the second engagement surface portion 23A is a lower surface of the inner surface of the through hole 23D and is formed substantially horizontally. The second contact surface portion 23B is a curved surface formed by chamfering the lower front corner of the second protrusion member 23. The second guide inclined surface portion 23C is a tip end surface (lower surface) of the second protrusion member 23, and is slightly inclined downward and rearward.

A second entry hole 10B is opened near the left front corner of the upper surface of the reading unit 10 (housing), and the second protrusion member 23 enters the inside of the reading unit 10 through the second entry hole 10B when the document cover 13 is turned to the closed state. The second protrusion member 23 is disposed on the rear side of the turning member 21 (the other side in the sliding direction) inside the reading unit 10. The second guide inclined surface portion 23C of the second protrusion member 23 faces the upper portion of the second auxiliary protrusion 28 with a small gap.

<Basing Member> As shown in FIG. 4 to FIG. 6, the biasing member 24 is integrally formed by connecting a slide biasing member 34 and a turn biasing member 35 through a member coupling part 36. The biasing member 24, for example, is made of metal such as hard steel wire.

The slide biasing member 34 is, for example, a compression coil spring, and is disposed between the rear wall 25A of the support member 25 and the vicinity of the rotational shaft 30 of the turning member 21. The support protrusion 29 protruding from the rear wall 25A is fitted in the rear end of the slide biasing member 34. The turn biasing member 35 is, for example, a torsional coil spring wound around the rotational shaft 30 extending rightward from the turning member 21. The arm portion 35A extending from the turn biasing member 35 extends downward and is engaged with the biasing receiving part 33 of the turning member 21 (see also FIG. 7). The member coupling part 36 connects the front end of the slide biasing member 34 as a spiral advancing in the front-and-rear direction and the right end of the turn biasing member 35 as a spiral advancing in the left-and-right direction. The slide biasing member 34 biases the turning member 21 forward (one side of the sliding direction), and the turn biasing member 35 biases the turning member 21 in the counterclockwise direction (one side of the turning direction) in FIG. 4.

Figure 8:
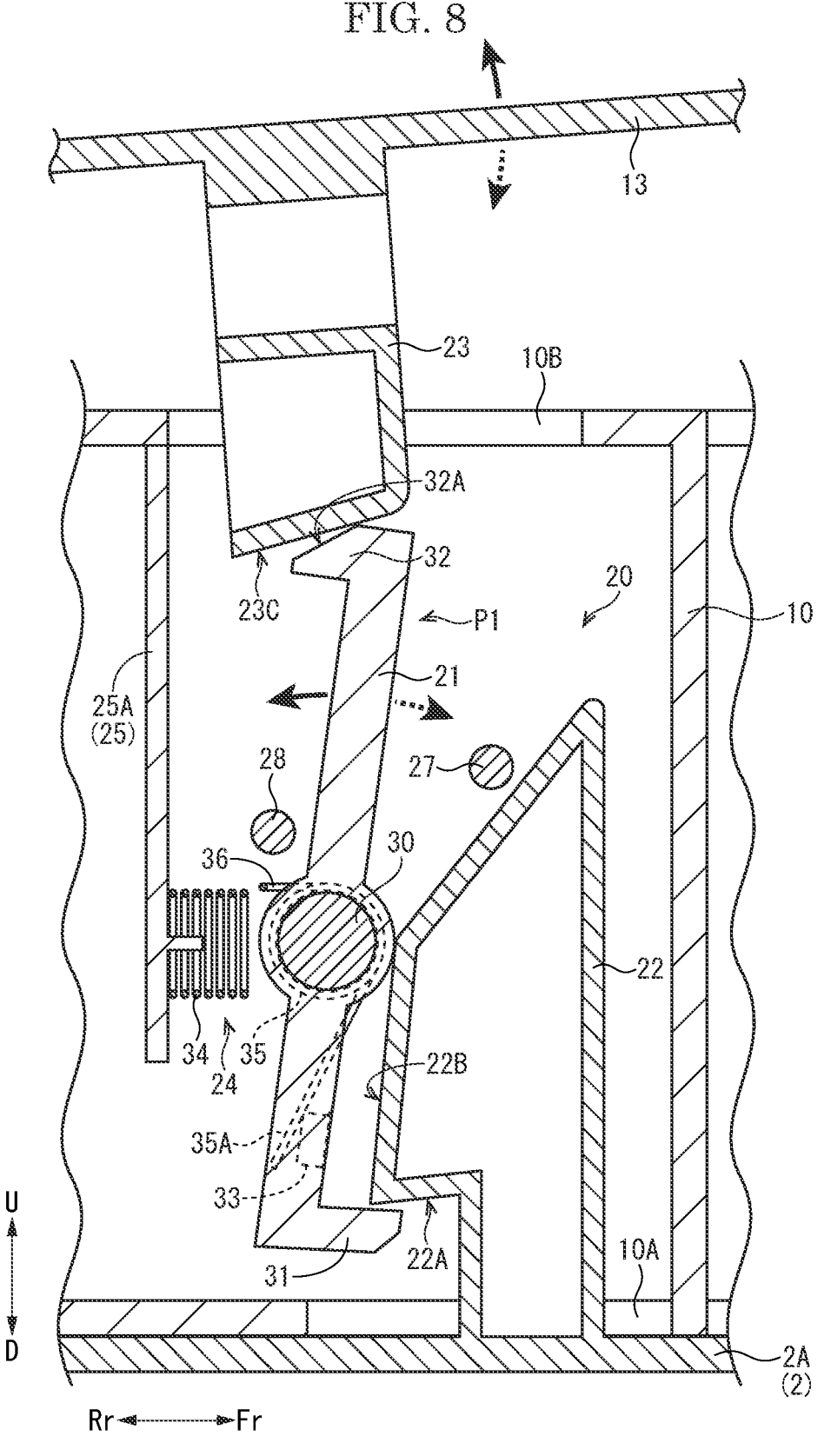
FIG. 8 is a sectional view showing a process in which the document cover is opened (or closed), in the lock part of the image forming apparatus according to the embodiment of the present invention.
Figure 9:
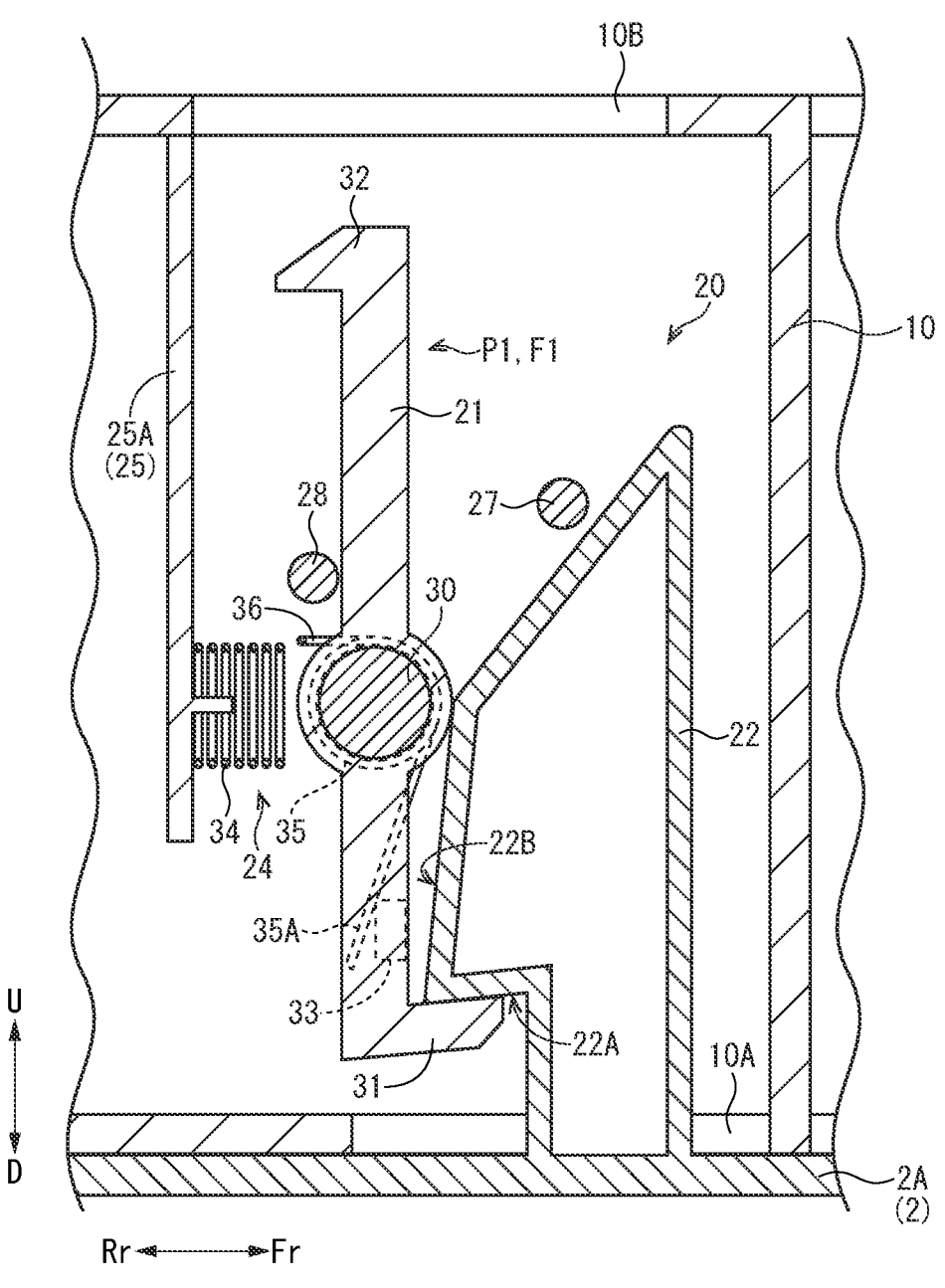
FIG. 9 is a cross sectional view showing a state in which the document cover is opened, in the lock part of the image forming apparatus according to the embodiment of the present invention.
Figure 10:
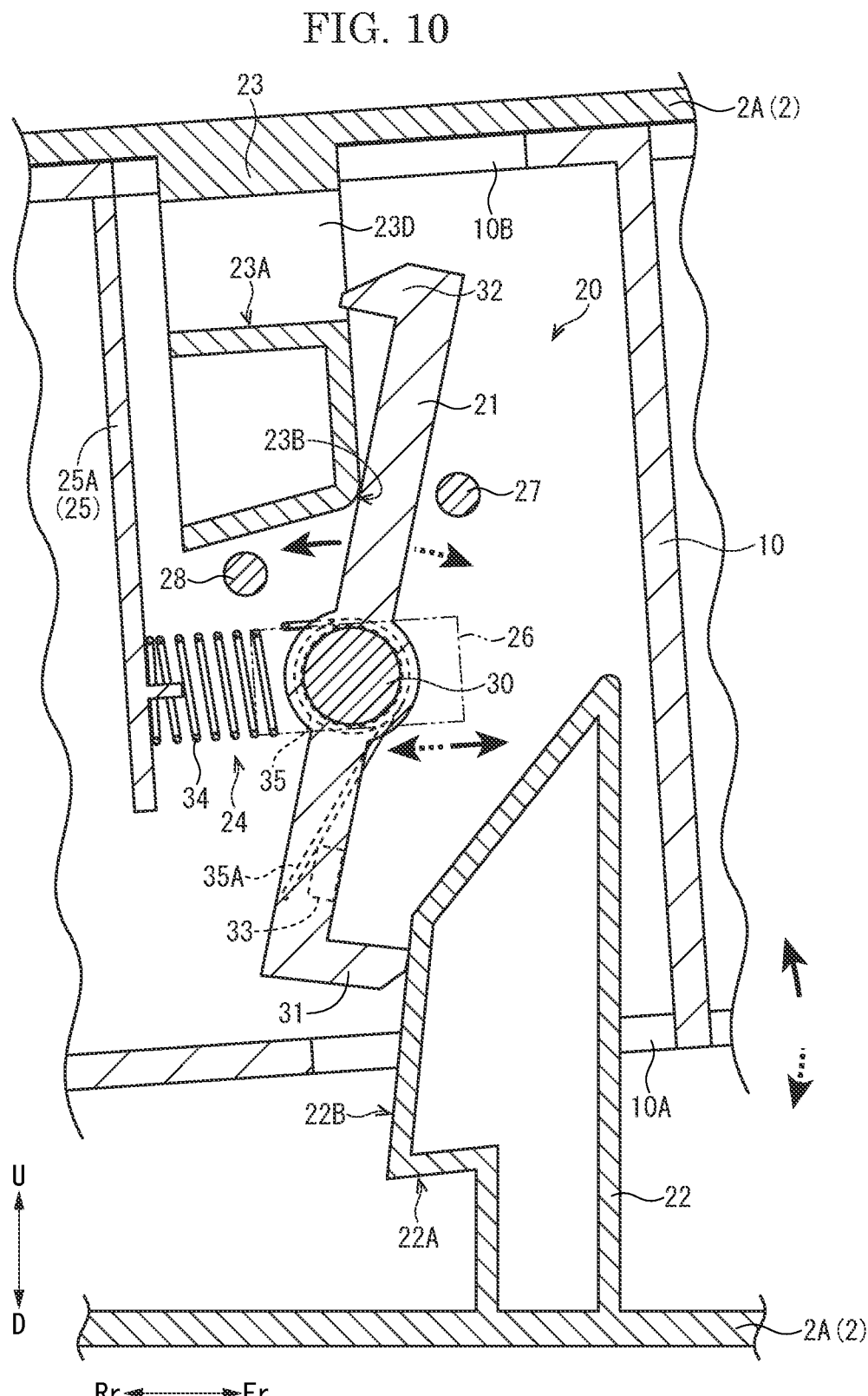
FIG. 10 is a cross sectional view showing a process (1) in which the reading unit is opened (or closed), in the lock part of the image forming apparatus according to the embodiment of the present invention.
Figure 11:
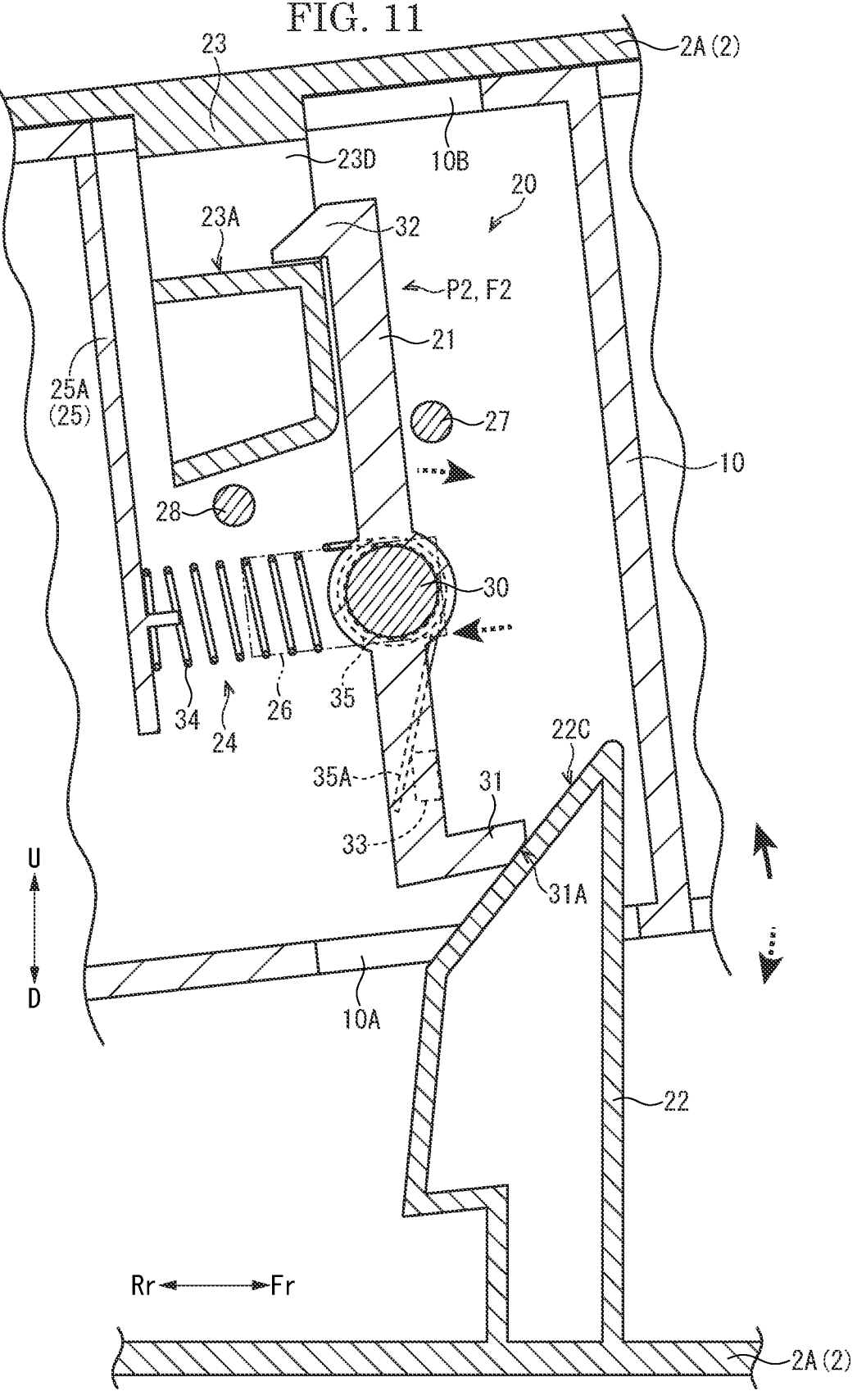
FIG. 11 is a cross sectional view showing the process (2) in which the reading unit is opened (or closed), in the lock part of the image forming apparatus according to the embodiment of the present invention.
Figure 12:
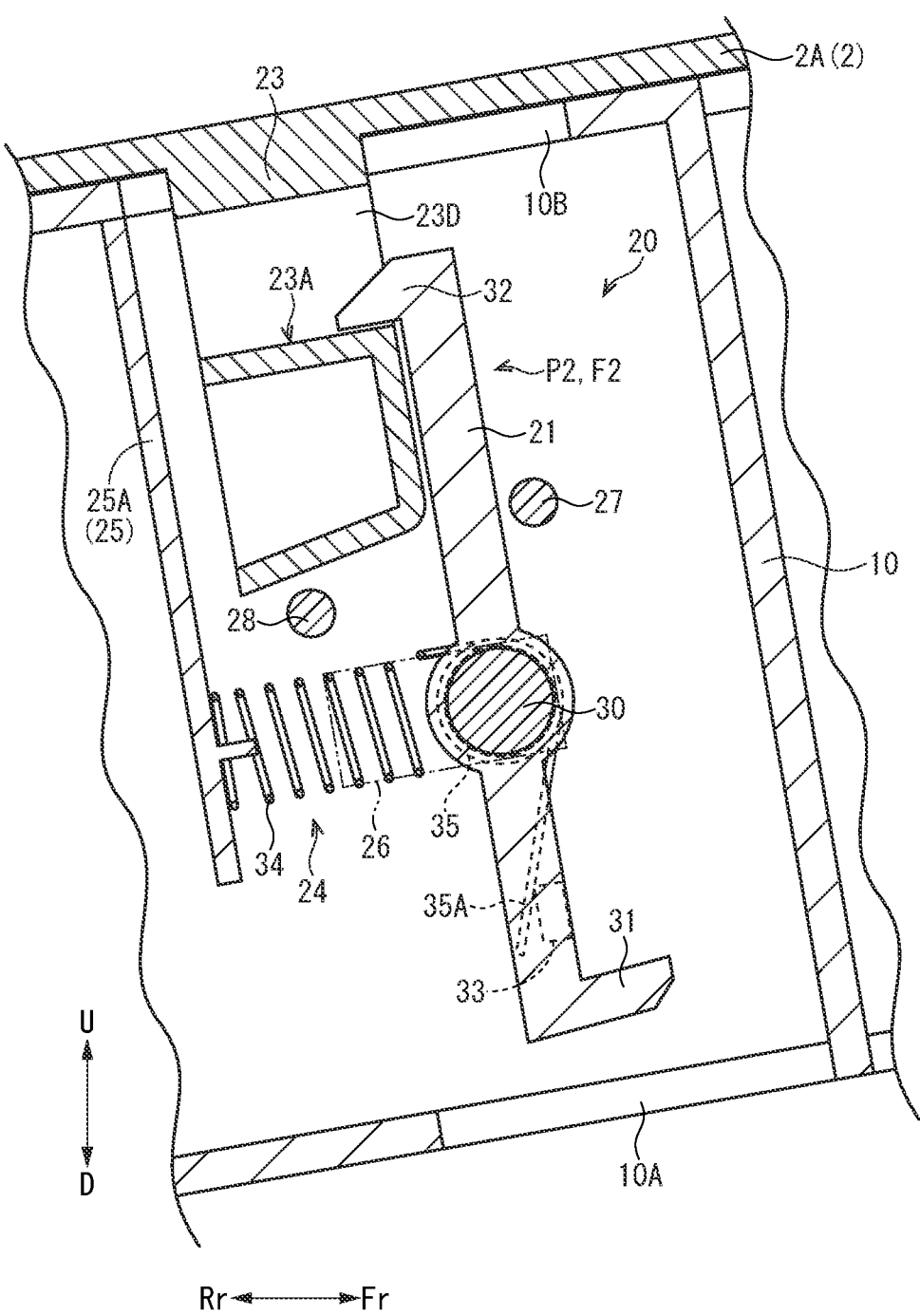
FIG. 12 is a cross sectional view showing a state where the reading unit is opened, in the lock part of the image forming apparatus according to the embodiment of the present invention.

[Operation of Lock Part] Next, with reference to FIG. 4 and FIG. 8 to FIG. 12, the operation of the lock part 20 will be described. FIG. 8 is a cross sectional view showing a process of opening (or closing) the document cover 13 (document conveying device 11). FIG. 9 is a cross sectional view showing a state in which the document cover 13 is opened. FIG. 10 and FIG. 11 are cross sectional views showing a process of opening (or closing) the reading unit 10. FIG. 12 is a cross sectional view showing a state in which the reading unit 10 is opened.

<Case where the reading unit and the document cover are turned to the closed state> As shown in FIG. 4, when the reading unit 10 and the document cover 13 are turned to the closed state, the turning member 21 is pushed rearward (the other side in the sliding direction) by the first protrusion member 22 against the biasing force of the slide biasing member 34 (by compressing the slide biasing member 34), and is disposed at the first position P1. The first contact surface portion 22B of the first protrusion member 22 abuts against the turning member 21 disposed at the first position P1. More specifically, the upper portion of the first contact surface portion 22B is in contact with the front portion of the cylindrical portion supporting the rotational shaft 30.

In addition, when the reading unit 10 and the document cover 13 are turned to the closed state, the turning member 21 is pressed by the second protrusion member 23 in the clockwise direction in FIG. 4 (the other side of the turning direction) against the biasing force of the turn biasing member 35 (by twisting the turn biasing member 35), and is in a release posture F3 where the first hook portion 31 and the second hook portion 32 are separated from the first protrusion member 22 and the second protrusion member 23. The second contact surface portion 23B of the second protrusion member 23 abuts against the turning member 21 in the release posture F3. More specifically, the second contact surface portion 23B is in contact with the rear surface of the turning member 21 above the center in the upper-and-lower direction.

As described above, when the reading unit 10 and the document cover 13 are turned to the closed state, neither of them is locked, and they can be opened from the closed state. When the reading unit 10 and the document cover 13 are turned to the closed state, the first auxiliary protrusion 27 faces the first guide inclined surface portion 22C of the first protrusion member 22, and the second auxiliary protrusion 28 faces the second guide inclined surface portion 23C of the second protrusion member 23.

<Case where the document cover is turned from the closed state to the opened state> As shown in FIG. 8 (see also the thick arrow shown by the solid line), in the process of opening the document cover 13 in the closed state, the second protrusion member 23 is pulled out from the reading unit 10, and is separated from the turning member 21. The turning member 21, which is released from the pressing by the second protrusion member 23, is biased by the turn biasing member 35 in the counterclockwise direction in FIG. 8 (one side of the tuning direction), and is turned in a first engagement posture F1 in which the first hook portion 31 is engaged with the first protrusion member 22 (see FIG. 9). Further, since the turning member 21 is kept in contact with the first contact surface portion 22B of the first protrusion member 22, it does not move in the front-and-rear direction but is maintained in the state of being arranged at the first position P1 (see FIG. 9).

As described above, when the document cover 13 is turned to the opened state (see FIG. 9), the turning member 21 engages the first hook portion 31 with the first engagement surface portion 22A of the first protrusion member 22. As a result, the turning of the reading unit 10 from the closed state to the opened state is regulated, and is maintained in the closed state.

<Case where the document cover is turned from the opened state to the closed state> As shown in FIG. 8 (see also the thick arrow indicated by the dashed line), in the process of closing the document cover 13 in the opened state, the second protrusion member 23 is inserted into the reading unit 10, and is in contact with the second inclined surface portion 32A of the second hook portion 32 of the turning member 21. When the document cover 13 is turned from the opened state to the closed state, the second guide inclined surface portion 23C of the second protrusion member 23 is slidably in contact with the second inclined surface portion 32A of the turning member 21 which is in the first engagement posture F1 at the first position P1, and turns the turning member 21 in the clockwise direction in FIG. 8 (the other side of the turning direction). As a result, the first hook portion 31 of the turning member 21 is separated from the first engagement surface portion 22A of the first protrusion member 22, and the turning member 21 is in the release posture F3 (see FIG. 4).

<Case where the reading unit is turned from the closed state to the opened state> As shown in FIG. 10 (see also the thick arrow indicated by the solid line), in the process of opening the reading unit 10 in the closed state, the first protrusion member 22 is relatively pulled out from the reading unit 10, and thus separated from the turning member 21. The turning member 21, which is released from the pressing by the first protrusion member 22, is biased forward (one side of the sliding direction) by the slide biasing member 34, and moved to the second position P2 (see FIG. 11 and FIG. 12). Further, the turning member 21 is biased by the turn biasing member 35 to be turned in the counterclockwise direction in FIG. 10 (one side of the turning direction), and is turned to a second engagement posture F2 where the second hook portion 32 is engaged with the second protrusion member 23 (see FIG. 11 and FIG. 12).

As described above, when the reading unit 10 is turned to the opened state (see FIG. 12), the turning member 21 engages the second hook portion 32 with the second engagement surface portion 23A of the second protrusion member 23. Thus, the turning of the document cover 13 from the closed state to the opened state is regulated, and the document cover 13 is maintained in the closed state.

<Case where the reading unit is turned from the opened state to the closed state> As shown in FIG. 11 (see also the thick arrow indicated by the dashed line), in the process of closing the reading unit 10 in the opened state, the first protrusion member 22 is inserted into the reading unit 10, and is in contact with the first inclined surface portion 31A of the first hook portion 31 of the turning member 21. When the reading unit 10 is turned from the opened state to the closed state, the first guide inclined surface portion 22C of the first protrusion member 22 slides in contact with the first inclined surface portion 31A of the turning member 21, which is in the second engagement posture F2 at the second position P2, and slides the turning member 21 rearward (the other side of the sliding direction) while turning it in the clockwise direction in FIG. 11 (the other side of the turning direction) (see also the thick arrows shown by dashed lines in FIG. 10 and FIG. 11). At this time, the first hook portion 31 (first inclined surface portion 31A) of the turning member 21 slides from the first guide inclined surface portion 22C to the first contact surface portion 22B (see FIG. 10 and FIG. 11). As a result, the first hook portion 31 is separated from the first protrusion member 22, the second hook portion 32 is separated from the second engagement surface portion 23A of the second protrusion member 23, and the turning member 21 is moved to the first position P1 and in the release posture F3 (see FIG. 4).

According to the image forming apparatus 1 according to the embodiment described above, when the document cover 13 is turned from the closed state to the opened state, the turning member 21 is automatically turned in the counterclockwise direction in FIG. 8 or the others (one side of the rotating direction) by the biasing force of the turn biasing member 35 to engage the first hook portion 31 with the first protrusion member 22, so that the reading unit 10 can be maintained in the closed state. On the other hand, when the reading unit 10 is turned from the closed state to the opened state, the turning member 21 is turned in the counterclockwise direction in FIG. 10 and the others by the biasing force of the turn biasing member 35 while moving forward (one side of the slide direction) by the slide biasing member 34 to engage the second hook portion 32 with the second protrusion member 23, so that the document cover 13 can be maintained in the closed state. As described above, the reading unit 10 or the document cover 13 can be automatically maintained in the closed state by a simple structure in which the slide biasing member 34 and the turn biasing member 35 exert the biasing force on the turning member 21 provided in a slidable and turnable manner.

Further, according to the image forming apparatus 1 according to the present embodiment, since the slide biasing member 34 and the turn biasing member 35 are connected and integrally formed, the number of components constituting the lock part 20 can be reduced, and the structure of the lock part 20 can be further simplified.

The image forming apparatus 1 according to the present embodiment is configured such that when the document cover 13 is turned from the opened state to the closed state, the second inclined surface portion 32A of the turning member 21 slides on the second guide inclined surface portion 23C of the second protrusion member 23 (see FIG. 8). According to this configuration, the second protrusion member 23 can smoothly enter the inside of the reading unit 10, and the turning member 21 can be smoothly turned to the release posture F3. In addition, when the reading unit 10 is turned from the opened state to the closed state, the first inclined surface portion 31A of the turning member 21 slides on the first guide inclined surface portion 22C of the first protrusion member 22 (see FIG. 11). According to this configuration, the first protrusion member 22 can smoothly enter the inside of the reading unit 10, and the turning member 21 can be turned in the release posture F3 while smoothly sliding it to the first position P1.

The image forming apparatus 1 according to the present embodiment is configured such that, when the reading unit 10 and the document cover 13 are turned to the closed state, the first auxiliary protrusion 27 faces the first guide inclined surface portion 22C, and the second auxiliary protrusion 28 faces the second guide inclined surface portion 23C (see FIG. 4). According to this configuration, even if the reading unit 10 and the document cover 13 are closed vigorously, and the first protrusion member 22 and the second protrusion member 23 enter the inside of the reading unit 10 excessively, since the guide inclined surface portions 22C, 23C interfere with the auxiliary protrusions 27, 28, excessive entry of the protrusion members 22, 23 into the inside of the reading unit 10 can be prevented. Furthermore, even if the turning member 21 turns beyond a predetermined turning range, the turning member 21 interferes with both auxiliary protrusions 27, 28, thereby preventing excessive turning of the turning member 21.

In the image forming apparatus 1 according to the present embodiment, the turning member 21 slides in the front-and-rear direction and can turn (swing) around the rotational shaft 30 extending in the left- and right-direction, but the direction in which the turning member 21 slides or rotates is not limited to this. For example, the turning member 21 may slide in the left-and-right direction, and can turn (swing) around the rotational shaft 30 extending in the front-and-rear direction (not shown).

In the image forming apparatus 1 according to the present embodiment, one lock part 20 is provided on the front portion of the left coupling support portion 2A, but the present invention is not limited thereto. For example, one lock part 20 may be provided on the front portion of the right coupling support portion 2A, or two lock parts 20 may be provided on the front portions of the left and right coupling support portions 2A (not shown). For example, the lock part 20 may be provided near the center of the coupling support portion 2A in the front-and-rear direction (not shown).

In the image forming apparatus 1 according to the present embodiment, the first hook portion 31 and the second hook portion 32 are formed at both the upper and lower end portions of the turning member 21, but the present invention is not limited thereto. The first hook portion 31 may be formed below the rotational shaft 30 so as to be engageable with the first protrusion member 22, and the second hook portion 32 may be formed above the rotational shaft 30 so as to be engageable with the second protrusion member 23. For example, at least one of the first hook portion 31 and the second hook portion 32 may be formed closer to the center portion than the end portions of the turning member 21, and the formation positions thereof may be freely changed (not shown).

In the image forming apparatus 1 according to the present embodiment, the slide biasing member 34 and the turn biasing member 35 are connected and integrally formed, but the present invention is not limited thereto. The slide biasing member 34 and the turn biasing member 35 may be formed separately (not shown).

In the image forming apparatus 1 according to the present embodiment, the reading unit 10 (supporting member 25) is provided with the first auxiliary protrusion 27 and the second auxiliary protrusion 28, but not limited thereto. Either one or both the first auxiliary protrusion 27 and the second auxiliary protrusion 28 may be omitted (not shown).

The image forming apparatus 1 according to the present embodiment is a so-called multifunctional peripheral, but it is not limited to this, and may be a copy machine, facsimile machine, or the like. The image forming method of the image forming device 1A is an electrophotographic method, but it is not limited thereto, and may be an inkjet method.

The description of the above embodiment shows one aspect of the image forming apparatus according to the present invention, and the technical scope of the present invention is not limited to the above embodiment. The present invention may be variously modified, substituted, or modified to the extent that it does not deviate from the purport of technical thought, and the claims include all embodiments that may be included within the scope of technical thought.

The invention claimed is:

1. An image forming apparatus comprising:
an apparatus main body housing an image forming unit which forms an image on a medium;
a reading unit provided on an upper portion of the apparatus main body in an openable and closable manner, and readable an image of a document;
a document cover provided on an upper portion of the reading unit in an openable and closable manner, and pressing the document placed on the reading unit; and
a lock part which holds one of the reading unit and the document cover in a closed state when the other of the reading unit and the document cover is in an opened state, wherein
the lock part includes:
a turning member supported in an inside of the reading unit in a slidable manner in a horizontal direction and in a turnable manner around a rotational shaft;
a first protrusion member protruded from the upper portion of the apparatus main body, and configured to enter the inside of the reading unit in the closed state and be disposed on one side of a sliding direction of the turning member;
a second protrusion member protruded from a lower portion of the document cover, and configured to enter the inside of the reading unit when the document cover is in the closed state and be disposed on the other side of the sliding direction of the turning member;
a slide biasing member biasing the turning member to one side of the sliding direction; and
a turn biasing member biasing the turning member to one side of a turning direction, and
the turning member has:
a first hook portion configured to be engageable with the first protrusion member below the rotational shaft; and
a second hook portion configured to be engageable with the second protrusion member above the rotational shaft, wherein
in a case where the reading unit and the document cover are in the closed state, the turning member is pushed by the first protrusion member to the other side of the sliding direction against a biasing force of the slide biasing member to be disposed in a first position, and is pushed by the second protrusion member to the other side of the turning direction against a biasing force of the turn biasing member to be in a release posture where the first hook portion and the second hook portion are separated from the first protrusion member and the second protrusion member,
in a case where the document cover is in the opened state, the second protrusion member is separated from the turning member, the turning member is disposed in the first position, is biased by the turn biasing member to be turned to one side of the turning direction and is in a first engagement posture where the first hook portion is engaged with the first protrusion member, and
in a case where the reading unit is in the opened state, the first protrusion member is separated from the turning member, the turning member is biased by the slide biasing member to one side of the sliding direction to be disposed in a second position, is biased by the turn biasing member to be turned to one side of the turning direction, and is in a second engagement posture where the second hook is engaged with the second protrusion member.

2. The image forming apparatus according to claim 1, wherein the slide biasing member and the turn biasing member are coupled to be formed integrally.

3. The image forming apparatus according claim 1, wherein the first hook portion has a first inclined surface portion which is in contact with the first protrusion member when the reading unit is turned from the opened state to the closed state, the second hook portion has a second inclined surface portion which is in contact with the second protrusion member when the document cover is turned from the opened state to the closed state, the first protrusion member has:

a first engagement surface portion with which the first hook portion is to be engaged;

a first contact surface portion abutting on the turning member disposed in the first position; and a first guide inclined surface portion configured to slide on the first inclined surface portion of the turning member in the second engagement posture at the second position when the reading unit is turned from the opened state to the closed state, and to slide the turning member to the other side of the sliding direction while turning the turning member to the other side of the turning direction, and the second protrusion member has:

a second engagement surface portion with which the second hook portion is to be engaged;

a second contact surface portion abutting on the turning member in the release posture; and a second guide inclined surface portion configured to slide on the second inclined surface portion of the turning member in the first engagement posture at the first position when the document cover is turned from the opened state to the closed state, and to turn the turning member to the other side of the turning direction.

4. The image forming apparatus according to claim 3, wherein a first auxiliary protrusion and a second auxiliary protrusion are extended parallel to the rotational shaft on both sides of the turning member in the sliding direction in the inside of the reading unit, the first auxiliary protrusion faces the first guide inclined surface portion of the first protrusion member when the reading unit is in the closed state, and the second auxiliary protrusion faces the second guide inclined surface portion of the second protrusion member when the document cover is in the closed state.

5. The image forming apparatus according to claim 1, wherein the sliding direction of the turning member is along a front-and-rear direction, and the rotational shaft is along a left-and-right direction perpendicular to the front-and-rear direction.

6. The image forming apparatus according to claim 1, wherein the reading unit is supported on a rear portion of the upper portion of the apparatus main body in a turnable manner, the document cover is supported on a rear portion of the upper portion of the reading unit, and the lock part is provided in front portions of the apparatus main body, the reading unit and the document cover.

* * * * *